United States Patent [19]

Yamada et al.

[11] 4,404,539
[45] Sep. 13, 1983

[54] SEMICONDUCTOR STRAIN GAUGE

[75] Inventors: Kazuji Yamada, Hitachi; Motohisa Nishihara, Katsuta; Hideo Sato, Hitachi; Seiko Suzuki, Ibaraki; Ryoichi Kobayashi, Hitachi, all of Japan

[73] Assignee: Hitachi, Ltd., Tokyo, Japan

[21] Appl. No.: 236,934

[22] Filed: Feb. 23, 1981

[30] Foreign Application Priority Data

Feb. 22, 1980 [JP] Japan ............................ 55/20440

[51] Int. Cl.³ .......................................... G01L 1/22
[52] U.S. Cl. ........................................ 338/3; 338/4
[58] Field of Search ............... 338/2, 3, 4, 5, 7, 9; 73/708; 357/26, 28; 29/610 SG

[56] References Cited

U.S. PATENT DOCUMENTS 3,402,609  9/1968  Chiku et al. ................... 357/26
3,654,545  4/1972  Demark ........................ 323/280

FOREIGN PATENT DOCUMENTS 2755211  6/1979  Fed. Rep. of Germany ........ 73/708

Primary Examiner—C. L. Albritton
Attorney, Agent, or Firm—Antonelli, Terry & Wands

[57] ABSTRACT

A semiconductor strain gauge is arranged as a bridge having four piezoresistive elements which each include a low impurity concentration diffused portion and a heavily-doped diffused portion. The resistance values of the two low impurity concentration diffused portions opposite each other in the bridge are greater than the resistance values of the other two lower impurity concentration portions. The resistances of the heavily-doped diffused portion are selected so that the resistance of the piezoresistive elements are equal. However, by virtue of the fact that the resistance temperature coefficient of the low impurity portions are greater than the resistance temperature coefficients of the high impurity portions, the overall resistance temperature coefficients of the bridge arms will be different. This permits the zero-point voltage of the bridge to always increase with an increase in temperature.

6 Claims, 4 Drawing Figures

SEMICONDUCTOR STRAIN GAUGE

BACKGROUND OF THE INVENTION

The present invention relates to a semiconductor strain gauge, and more particularly to a semiconductor strain gauge having means to carry out zero-point temperature compensation.

Semiconductor strain gauges utilizing a strain gauge diaphragm as the pressure-sensitive elements are known. In the strain gauge of the integral type, a flexible diaphragm is formed in a semiconductor substrate such as silicon. The strain gauge resistance elements or piezoresistive elements are integrally formed on one side of the diaphragm by diffusion process.

The output of the strain-electric signal conversion bridge at the time when the strain is zero exhibits the so-called temperature-dependency in which it changes with a temperature change, on account of the discrepancies of the resistance values and the temperature coefficients of the plurality of gauges constituting the bridge. This temperature-dependency is the zero-point temperature-dependency, and it is the zero-point temperature compensation that reduces and compensates for such temperature-dependency.

For example, U.S. Pat. No. 3,654,545 entitled "SEMICONDUCTOR STRAIN GAUGE AMPLIFIER" (issued on Apr. 4, 1972) discloses a semiconductor strain gauge amplifier which includes a temperature sensor such as thermistor in order to realize such zero-point temperature compensation. Such a compensation circuit, however, is undesirably complicated.

SUMMARY OF THE INVENTION

An object of the present invention is to provide a semiconductor strain gauge which has a zero-point temperature compensation circuit of simple structure and whose output does not vary even when the ambient temperature has changed.

DESCRIPTION OF THE PREFERRED EMBODIMENT

Figure 1:
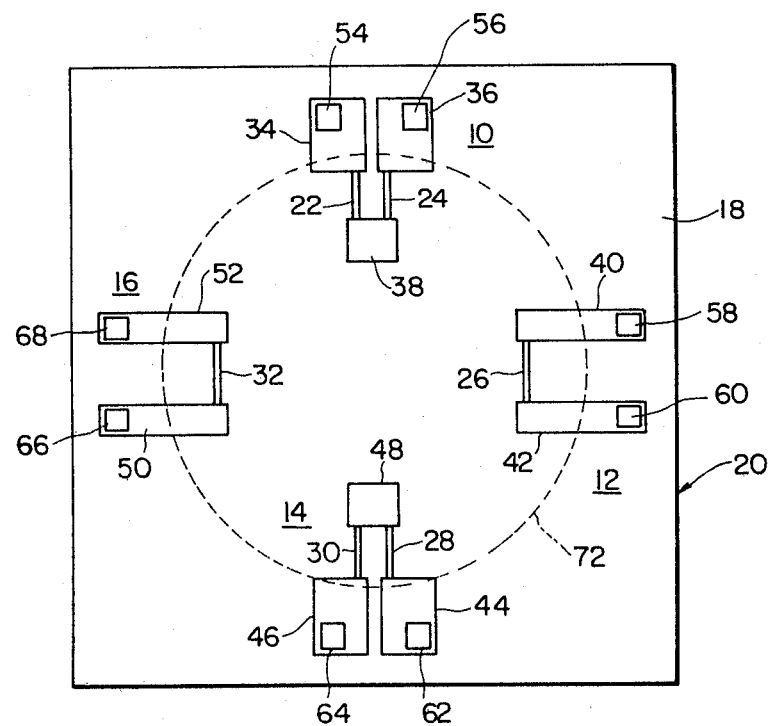
FIG. 1 is a plan view of the preferred embodiment of a semiconductor pressure sensor according to the present invention.
Figure 2:
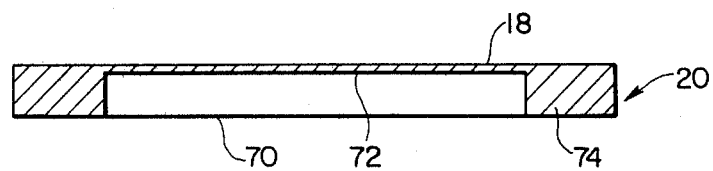
FIG. 2 is a cross-sectional side view along line II—II of FIG. 1.

In FIGS. 1 and 2, four strain gauge elements or resistances 10, 12, 14, and 16 are formed in a major surface 18 of a substrate 20 by diffusion process. The respective gauge elements 10, 12, 14 and 16 are composed of low impurity concentration piezoresistive portions 22, 24, 26, 28, 30, and 32 and high impurity concentration piezoresistive portions or heavily-doped diffusion resistance portions 34, 36, 38, 40, 42, 44, 46, 48, 50 and 52. In general, a silicon substrate of N type conductivity is used as the substrate 20 and the elements of P type conductivity 10, 12, 14 and 16 are formed by diffusing an impurity into the semiconductor substrate 20. Since the impurity concentration of the piezoresistive portions 34–52 is higher than that of the piezoresistive portions 22, 24, 26, 28, 30 and 32, the temperature coefficient of the low impurity concentration piezoresistive portions 22–32 is greater than that of the heavily-doped diffused resistance portions 34–52.

Contact portions 54, 56, 58, 60, 62, 64, 66 and 68 are disposed in the heavily-doped diffused resistance portions 34, 36, 58, 60, 62, 64, 66 and 68 respectively. Therefore, the low impurity concentration portions and the heavily-doped portions are connected in series between these contacts.

The resistance values $R_1$, $R_3$ of the resistance portions 22, 24 and 28, 30 ($R_1$: resultant resistance of portions 22, 24 $R_3$: resultant resistance of the portions 28, 30) confronted with each other are greater than the resistance values $R_2$, $R_4$ of the resistance portions 26, 32.

On the other hand, the resistance values $r_1$, $r_3$ of the heavily-doped diffusion portions 34–38 and 44, 48 ($r_1$: resultant resistance of the portions 34–38, $r_3$: resultant resistance of the portions 44–48) are smaller than the resistance values $r_2$, $r_4$ of the resistance portions 40, 42 and 50, 52 ($r_2$: resultant resistance of the portions 40 and 42 $r_4$: resultant resistance of portions 50, 52).

The resistance values $R_{11}$, $R_{21}$, $R_{31}$ and $R_{41}$ of the gauge elements 10, 12, 14, 16 as viewed from the respective contact portions 54–56, 58–60, 62–64 and 66–68 (series resistance values of the low impurity concentration portion and heavily-doped diffusion portion) are formed substantially equal.

A surface 70 opposite to the major surface 18 is etched or machined, and the substrate 20 is formed with a diaphragm 72 in an area including the respective resistors and with a fixing portion 74 for fixing the substrate 20 to another object in a peripheral part outside the diaphragm 72.

When the semiconductor strain gauge of such structure is subjected to a working force such as pressure, the diaphragm 72 flexes, and the respective resistors 10, 12, 14 and 16 diffused and formed in the major surface 18 corresponding to the diaphragm portion deform and change their resistance values. By deriving the changes of the resistance values as electric signals, the working force such as pressure can be gauged.

Figure 3:
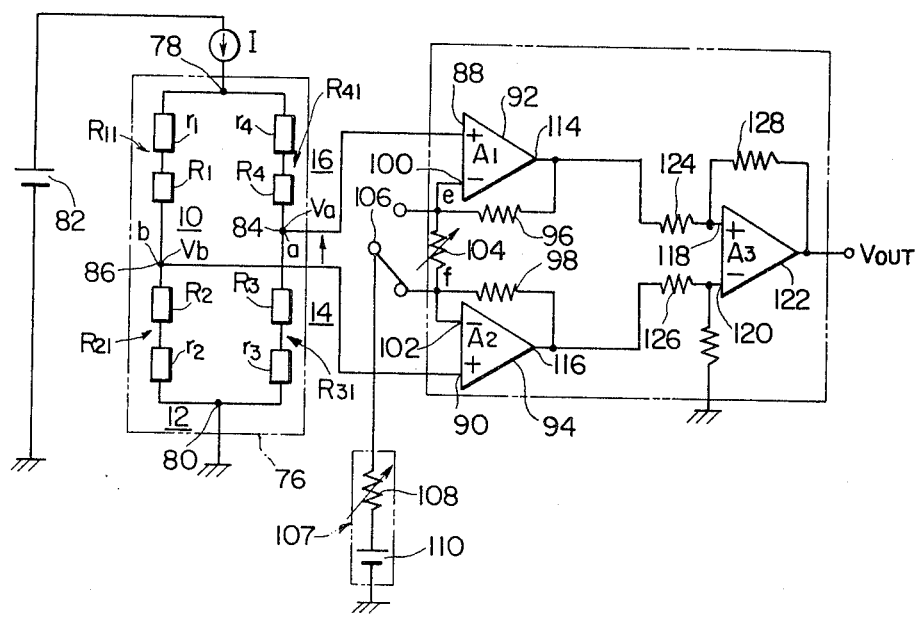
FIG. 3 is a circuit diagram showing the semiconductor pressure sensor according to the present invention.

As shown in FIG. 3, the four gauge elements 10, 12, 14 and 16 form a Wheatstone bridge circuit 76. The gauge elements 10 and 14 vary the resistance values $R_{11}$ and $R_{31}$ in the opposite polarities to those of the other resistors $R_{21}$ and $R_{41}$. The input terminals 78, 80 of the bridge 76 are connected to a d.c. source 82 and output terminals 84, 86 thereof are connected to positive input terminals 88 and 90 of amplifiers 92 and 94. The sum of the currents I flowing through the resistors 10, 12, 14 and 16 is held at a predetermined value by a reference voltage circuit (not shown).

The amplifiers 92 and 94 are respectively subjected to negative feedback through resistances 96 and 98, and the negative inputs 100 and 102 of the amplifiers 92 and 94 are connected to each other through a resistance 104. Further, either of the negative input 100 of the amplifier 92 and that 102 of the amplifier 94 is connected by means of a switch 106 and is connected to a reference potential circuit 107 which consists of a resistance 108 and a d.c. source 110 connected in series with the resistance 108. The reference potential circuit 107 is adjusted so that it may generate the same potential as those of the terminals 84 and 86 of the two arms in the state in which the bridge is balanced at a certain specified temperature (e.g., normal temperature of 20° C.) and under a certain specified pressure (e.g., zero pressure).

The outputs 114, 116 of the amplifiers 92 and 94 are respectively applied to the positive input 118 and negative input 120 of a differential amplifier 122 through resistances 124 and 126. A feedback resistance 128 is inserted between the output 130 of the differential amplifier 122 and the positive input 124 thereof. The negative input 120 is grounded through a resistance 130.

Now, when a pressure is applied to the semiconductor strain gauges, the resistance values of the semiconductor strain gauge elements 10, 12, 14 and 16 vary in accordance with the magnitude of the pressure, and a difference arises between the potential as of the midpoints a and b terminals 84 and 86 of the two arms of the bridge 76. The midpoint potentials $V_a$, $V_b$ are amplified by the amplifiers 92 and 94, and the difference of the amplified midpoint potentials $V_a$ and $V_b$ is taken by the differential amplifier 122 to obtain the output $V_{OUT}$.

The zero-point temperature compensation will now be described. The zero-point temperature compensation is realized in such a way that the reference potential from the foregoing reference potential circuit, namely, the potential equal to those of the midpoints 84 and 86 of the two arms of the bridge balanced at the normal temperature is connected to either of the negative input points 100 and 102 of the amplifiers 92 and 94 through the variable resistance 104 and by means of the switch 106. The sign of the zero-point temperature compensation is determined by a contact to which the switch 106 is connected, and the quantity of the compensation is determined by the magnitude of the reference potential circuit 107.

The amplifiers 92 and 94 are made up of operational amplifiers of high gain, and the outputs of these amplifiers 92 and 94 are connected to the negative inputs 100 and 102 of their own through the respective resistances 96 and 98. Therefore, the potentials of the points e and f are substantially equal to the potentials of the midpoints a and b of the two arms of the bridge.

The resistance value $R_C$ of the variable resistance 108 which determines the quantity of the compensation is evaluated by the following expression:

$$R_C = (R_{96}/A) \cdot (V_B'/E_{OUT}) \quad (1)$$

where A denotes the gain of the differential amplifier 92, $R_{96}$ the resistance value of the resistance 96 or 98, and $V_B'$ the voltage variation (substantially equal to $V_B$) between the points e and f corresponding to a prescribed temperature.

In the individual strain-electric signal conversion apparatuses, the output variations corresponding to the predetermined strain are adjusted by adjusting the variable resistances 104. As apparent from Expression (1), the output variations corresponding to the predetermined strain is not influenced by the resistance value of the variable resistance 104. In other words, in the strain-electric signal conversion apparatus according to the present embodiment, the resistance value $R_C$ of the resistance 108 for the zero-point temperature compensation is not affected by the resistance value of the variable resistance 104 for adjusting the variation of the output.

Hereunder will be described the zero-point temperature compensation of the circuit stated above. It is now assumed by way of example that a rise in the ambient temperature has cast the balance of the bridge, in other words, rendered the potential of the midpoint a of the bridge higher than the potential of the midpoint b. Then, both the output voltages of the amplifiers 92 and 94 rise with increases in the resistance values of the gauge elements 10–16 of the bridge, but the output of the amplifier 92 becomes slightly greater than the output of the amplifier 94. Therefore, if the zero-point temperature compensation circuit for the amplifiers is not disposed, the output $V_{OUT}$ of the differential amplifier 122 will generate a positive output. At this time, however, in a case where the switch 106 is connected to the upper contact, that is, where the voltage of the midpoints of the bridge balanced at the normal temperature and under the zero pressure is connected to the negative input of the amplifier 94, current which is fed-back to this negative input through the resistance 98 is increased. This is because a still greater current flows via the resistance 108 owing to the difference between the output voltage of the amplifier 94 and the voltage of the d.c. source 110. Therefore, the output voltage of the amplifier 94 increases, and the output of the differential amplifier 122 decreases and finally becomes zero. When the signs of the potentials of the midpoints a and b of the bridge have fallen into the opposite relation, the switch 106 is thrown onto the upper side.

In the embodiment as shown in FIGS. 1, 2, 3, the zero-point output $V_o$ of the bridge always increases with the temperature rise irrespective of whether its diviation is positive or negative, because the resistance temperature coefficients of the gauge elements 10 and 14 are greater than those of the gauge elements 12 and 16. As illustrated by a curve $C_1$ in FIG. 4, whether the zero point (the bridge output voltage during the null pressure) $V_o$ at the reference temperature (for example, 20° C.) is plus or minus, its temperature characteristic can be brought into a gradient in an identical directions.

Figure 4:
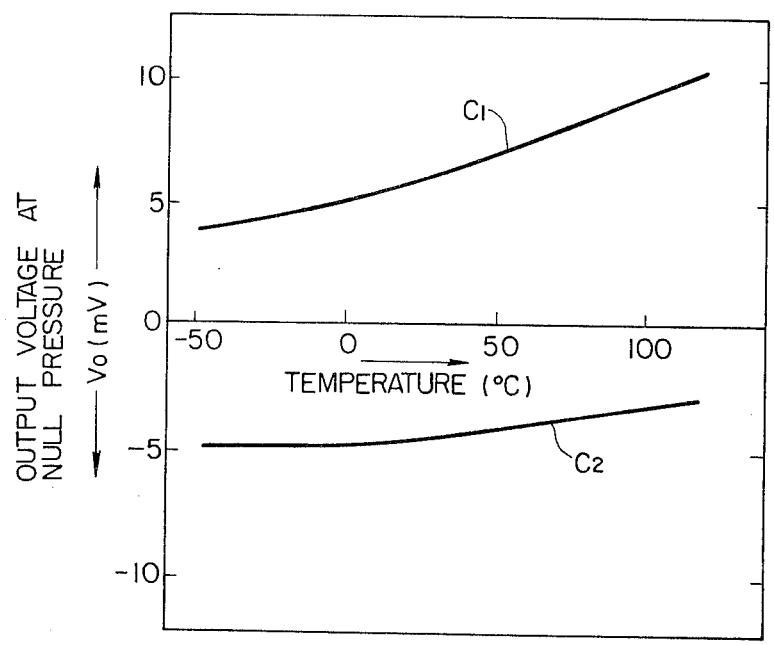
FIG. 4 is a graph explaining the temperature compensation.

The gradient of each curve $C_1$ or $C_2$ shown in FIG. 4 (the temperature gradient of the zero point $V_o$) can be arbitrarily selected with the diffusion concentration and the resistance values of the respective gauge elements, so that a characteristic necessary for the zero-point temperature compensation or for flattening the temperature characteristic of the zero point $V_o$ can be obtained.

With the semiconductor strain gauge of this invention shown in FIGS. 1–3, accordingly, in case of connecting the zero point temperature compensation circuit in FIG. 3, either the point e or f the point may be selected, and the compensation circuits may be connected to the same points for all the products.

Since only the connecting portion of either the point e or the point f may therefore be disposed, a circuit substrate can be miniaturized and simplified, and simulataneously, the facilitation of the connecting operations and the prevention of mistakes in the operations can be achieved.

We claim:

1. A semiconductor strain gauge comprising:
   a semiconductor substrate of one conductivity on which a pressure sensitive diagram is formed; and
   at least two piezoresistive elements formed in a major surface of said semiconductive substrate adjacent to said pressure sensitive diaphragm and having an opposite conductivity to said one conductivity,
   wherein each of said piezoresistive elements includes at least one low impurity concentration diffused portion and at least one heavily-doped diffused portion connected in series, said low impurity concentration portion having a higher resistance temperature coefficient than that of the heavily-doped portion, and further wherein the resistance for each of the respective diffused portions of the piezoresistive elements is set to provide a resistance value of one low impurity concentration diffused portion in one of said piezoresistive elements higher than that of a low impurity concentration diffused portion in the other of said piezoresistive elements and a resistance value of one heavily-doped diffused portion in said one of said piezoresistive elements smaller than that of a heavily-doped diffused portion in said other of said piezoresistive elements, so that said two piezoresistive elements are substantially equal in their overall resistance but unequal in their overall resistance temperature coefficient, with the overall resistance temperature coefficient of said one piezoresistive element being greater than the overall resistance temperature coefficient of said other piezoresistive element.

2. A semiconductor strain gauge according to claim 1, wherein four of said piezoelectric elements are formed in said major surface of said semiconductor substrate adjacent to said pressure sensitive diaphragm, said four elements being coupled together to form an electrical bridge circuit with first, second, third and fourth arms, each having one of said elements, said first and third arms being opposite to one another and said second and fourth arms being opposite to one another and further wherein the resistance of the respective diffused portions of each of said elements in said four arms is set so that all of the arms will have a substantially equal resistance, but the resistance temperature coefficient of said first and third arms will be greater than the resistance temperature coefficient of said second and fourth arms.

3. A semiconductor strain gauge according to claim 1, wherein said one piezoresistive element comprises a U-shaped element having a pair of said low impurity portions coupled together by a highly-doped portion, and wherein said other piezoresistive element comprises a U-shaped element having a pair of said highly-doped portions coupled together by a low impurity portion.

4. A semiconductor strain gauge according to claim 2, wherein the piezoresistive elements of said first and third arms comprise U-shaped elements having a pair of said low impurity portions coupled together by a highly-doped portion, and wherein the piezoresistive elements of said second and fourth arms comprise U-shaped elements having a pair of highly-diffused portions coupled together by a low impurity portion.

5. A semiconductor strain gauge for coupling to a zero-point compensation circuit comprising:

a semiconductor substrate of one conductivity, on which a pressure sensitive diaphragm is formed; and at least two piezoresistive elements formed in a major surface of said semiconductive substrate adjacent to said pressure sensitive diaphragm and having an opposite conductivity to said one conductivity, wherein each of said piezoresistive elements includes at least one low impurity concentration diffused portion and at least one heavily-doped diffused portion connected in series, said low impurity concentration portion having a higher resistance temperature coefficient than that of the heavily-doped portion, and further wherein the resistance for each of the respective diffused portions of the piezoresistive elements is set to provide a resistance value of one low impurity concentration diffused portion in one of said piezoresistive elements higher than that of a low impurity concentration diffused portion in the other of said piezoresistive elements and a resistance value of one heavily-doped diffused portion in said one of said piezoresistive elements smaller than that of a heavily-doped diffused portion in said other of said piezoresistive elements, so that said two piezoresistive elements are substantially equal in their resistance but unequal in their overall resistance temperature coefficient, with the overall resistance temperature coefficient of said one piezoresistive element being greater than the overall temperature coefficient of said other piezoresistive element so that a zero-point output voltage of said strain gauge which will be fed to said zero-point compensation circuit will always increase with a rise in temperature.

6. A semiconductor strain gauge according to claim 5, wherein four of said piezoelectric elements are formed in said major surface of said semiconductor substrate adjacent to said pressure sensitive diaphram, said four elements being coupled together to form an electrical bridge circuit with first, second, third and fourth arms, each having one of said elements, said first and third arms being opposite to one another and said second and fourth arms being opposite to one another and further wherein the resistance of the respective diffused portions of each of said elements in said four arms is set so that all of the arms will have a substantially equal resistance, but the resistance temperature coefficient of said first and third arms will be greater than the resistance temperature coefficient of said second and fourth arms.

* * * * *